US009946012B2

(12) United States Patent
Blessitt et al.

(10) Patent No.: US 9,946,012 B2
(45) Date of Patent: Apr. 17, 2018

(54) EDGELIT LED BLADE FIXTURE

(71) Applicant: Cooper Technologies Company, Houston, TX (US)

(72) Inventors: James H. Blessitt, Peachtree City, GA (US); Paul W. Lewis, Jr., Grantville, GA (US)

(73) Assignee: Cooper Technologies Company, Houston, TX (US)

( * ) Notice: Subject to any disclaimer, the term of this patent is extended or adjusted under 35 U.S.C. 154(b) by 207 days.

(21) Appl. No.: 14/826,722

(22) Filed: Aug. 14, 2015

(65) Prior Publication Data

US 2015/0355406 A1   Dec. 10, 2015

Related U.S. Application Data

(63) Continuation of application No. 13/836,853, filed on Mar. 15, 2013, now Pat. No. 9,110,209.

(51) Int. Cl.
*F21V 7/04* (2006.01)
*F21V 8/00* (2006.01)
(Continued)

(52) U.S. Cl.
CPC .............. *G02B 6/0088* (2013.01); *F21K 9/90* (2013.01); *F21S 8/026* (2013.01); *F21V 15/01* (2013.01);
(Continued)

(58) Field of Classification Search
CPC .. G02B 6/00; F21S 8/026; F21S 8/028; F21V 21/02; F21V 2008/006; F21V 1/04; F21Y 2115/10
(Continued)

(56) References Cited

U.S. PATENT DOCUMENTS

| 4,622,624 A | 11/1986 | McCarthy |
| D374,301 S | 10/1996 | Kieffman |

(Continued)

FOREIGN PATENT DOCUMENTS

| CN | 2380795 | 5/2000 |
| CN | 1371018 | 9/2002 |

(Continued)

OTHER PUBLICATIONS

European Search Report for Application No. EP 14769537 dated Jul. 7, 2016.

(Continued)

*Primary Examiner* — Bao Q Truong
*Assistant Examiner* — Matthew Peerce
(74) *Attorney, Agent, or Firm* — King & Spalding LLP

(57) ABSTRACT

A lighting fixture that includes a frame, a heat sink assembly, an LED assembly, and a reflector. The frame includes a first end plate and a second end plate, each end plate including a slot formed therein. The slot extends from a top edge of the end plates towards a bottom edge of the end plates. The heat sink assembly includes one or more LEDs and a lightguide having a first longitudinal edge that receives light emitted from the LEDs. A first edge and a second edge of the lightguide are slidably inserted respective slots. The heat sink assembly includes a heat sink base and a heat sink cap coupled thereto which forms a first cavity for housing the LEDs and a second cavity adjacent the first cavity for housing a portion of the lightguide. The reflector is coupled to the end plates.

18 Claims, 8 Drawing Sheets

(51) Int. Cl.

| | | |
|---|---|---|
| *F21K 9/90* | (2016.01) | |
| *F21S 8/02* | (2006.01) | |
| *F21V 15/01* | (2006.01) | |
| *F21V 29/74* | (2015.01) | |
| *F21V 23/00* | (2015.01) | |
| *F21Y 103/10* | (2016.01) | |
| *F21Y 115/10* | (2016.01) | |

(52) U.S. Cl.
CPC .......... *G02B 6/0011* (2013.01); *G02B 6/0035* (2013.01); *G02B 6/0055* (2013.01); *G02B 6/0063* (2013.01); *G02B 6/0065* (2013.01); *G02B 6/0068* (2013.01); *G02B 6/0085* (2013.01); *F21V 7/04* (2013.01); *F21V 23/002* (2013.01); *F21V 29/74* (2015.01); *F21V 2200/20* (2015.01); *F21Y 2103/10* (2016.08); *F21Y 2115/10* (2016.08)

(58) Field of Classification Search
USPC ................................................ 362/235, 607
See application file for complete search history.

(56) References Cited

U.S. PATENT DOCUMENTS

| | | | |
|---|---|---|---|
| D386,804 | S | 11/1997 | Engel |
| 5,988,836 | A | 11/1999 | Swarens |
| D477,891 | S | 7/2003 | Fritze et al. |
| D496,121 | S | 9/2004 | Santoro |
| D593,246 | S | 5/2009 | Fowler et al. |
| D595,006 | S | 6/2009 | Santoro |
| D604,000 | S | 11/2009 | Fowler |
| D608,490 | S | 1/2010 | Chung |
| D608,932 | S | 1/2010 | Castelli |
| D633,247 | S | 2/2011 | Kong et al. |
| D653,376 | S | 1/2012 | Kong et al. |
| 8,128,256 | B2 | 3/2012 | Kim et al. |
| D664,699 | S | 7/2012 | Nakahira et al. |
| 8,232,724 | B2 | 7/2012 | Mostoller et al. |
| D665,119 | S | 8/2012 | Bryant |
| D667,983 | S | 9/2012 | Pickard et al. |
| D672,079 | S | 12/2012 | Kong et al. |
| D673,711 | S | 1/2013 | Pickard et al. |
| D675,364 | S | 1/2013 | Watt |
| D677,820 | S | 3/2013 | Mayfield et al. |
| D678,597 | S | 3/2013 | Lehman et al. |
| D681,872 | S | 5/2013 | Kong et al. |
| D685,942 | S | 7/2013 | Duquette et al. |
| D692,610 | S | 10/2013 | Sitarski |
| 8,561,961 | B1 | 10/2013 | Blessitt |
| D696,449 | S | 12/2013 | Boyer et al. |
| D698,969 | S | 2/2014 | Johns et al. |
| D698,973 | S | 2/2014 | Santoro et al. |
| D698,975 | S | 2/2014 | Blessitt et al. |
| D699,386 | S | 2/2014 | Park et al. |
| D701,988 | S | 4/2014 | Clements |
| D705,474 | S | 5/2014 | Philips |
| D705,974 | S | 5/2014 | Blessitt et al. |
| D707,873 | S | 6/2014 | Boyer et al. |
| D714,988 | S | 10/2014 | Park et al. |
| D728,153 | S | 4/2015 | Blessitt |
| D735,391 | S | 7/2015 | Blessitt |
| D739,977 | S | 9/2015 | Boyer |
| 9,127,826 | B2 | 9/2015 | Boyer |
| D762,908 | S | 8/2016 | Blessitt |
| D774,234 | S | 12/2016 | Plourde |
| 9,521,727 | B1 | 12/2016 | Clements |
| 2008/0055534 | A1 | 3/2008 | Kawano |
| 2009/0103327 | A1 | 4/2009 | Iwasaki et al. |
| 2010/0165662 | A1 | 7/2010 | Hamada |
| 2010/0271841 | A1 | 10/2010 | Kim |
| 2011/0176306 | A1 | 7/2011 | Kim et al. |
| 2012/0169967 | A1 | 7/2012 | Han et al. |
| 2012/0182713 | A1 | 7/2012 | Bretschneider |
| 2012/0281432 | A1 | 11/2012 | Parker |
| 2012/0287625 | A1* | 11/2012 | Macwan ............... F21V 29/004 362/235 |
| 2013/0021792 | A1* | 1/2013 | Snell .................... F21V 7/0008 362/218 |
| 2013/0039050 | A1 | 2/2013 | Dau et al. |
| 2013/0051067 | A1 | 2/2013 | Chen |
| 2013/0194820 | A1 | 8/2013 | Pickard et al. |
| 2013/0208457 | A1 | 8/2013 | Durkee et al. |
| 2013/0294053 | A1 | 11/2013 | Marquardt et al. |
| 2013/0307420 | A1 | 11/2013 | Yoder et al. |
| 2014/0036533 | A1 | 2/2014 | Smith-Gillespie |
| 2014/0198481 | A1* | 7/2014 | Kim ....................... F21S 8/026 362/95 |
| 2014/0265930 | A1* | 9/2014 | Harris ................ H05B 33/0842 315/307 |
| 2014/0268869 | A1 | 9/2014 | Blessitt et al. |

FOREIGN PATENT DOCUMENTS

| | | |
|---|---|---|
| CN | 101471011 A | 7/2009 |
| CN | 101839430 | 9/2010 |
| DE | 20104726 | 7/2002 |
| WO | WO 2012030387 | 3/2012 |
| WO | WO 2012154342 | 11/2012 |

OTHER PUBLICATIONS

International Search Report for PCT/US2014/026500, dated Aug. 7, 2014.

Cooper Lighting, Skyridge 1×4, 1×2 PAR Graphic Documentation; Nov. 14, 2013.

* cited by examiner

EDGELIT LED BLADE FIXTURE

CROSS REFERENCE TO RELATED APPLICATIONS

This application claims priority to U.S. Non-Provisional patent application Ser. No. 13/836,853 filed Mar. 15, 2013 and entitled "Edgelit LED Blade Fixture," the entire contents of which are hereby incorporated herein by reference.

TECHNICAL FIELD

The present invention relates generally to lighting fixtures. More specifically, the present invention relates to an apparatus and method providing assembly solutions for an edgelit LED blade fixture.

BACKGROUND

According to the prior art, the conventional bladed light fixtures include a blade having a front panel and a rear panel and a light source positioned behind the rear panel. The light source is oriented to direct light output into the blade from the rear panel so that the light is emitted through at least the front panel. The light source is any type of light source including, but not limited to, incandescent bulbs, compact fluorescent light bulbs, halogen bulbs, and light sources using one or more light emitting diodes. Hence, these conventional bladed light fixtures are typically referred to as being backlit. The blade is typically fabricated from an acrylic material that is opaque such that the light source is not visible through the blade when viewed from the front panel. This opaque blade decreases the light output efficiency of the light fixture, thereby resulting in increase costs. These increased costs are generally associated with one or more of using more light sources, operational costs associated with the use of more light sources, and manufacturing costs.

BRIEF DESCRIPTION OF THE DRAWINGS

The foregoing and other features and aspects of the invention are best understood with reference to the following description of certain exemplary embodiments, when read in conjunction with the accompanying drawings, wherein.

Figure 1A:
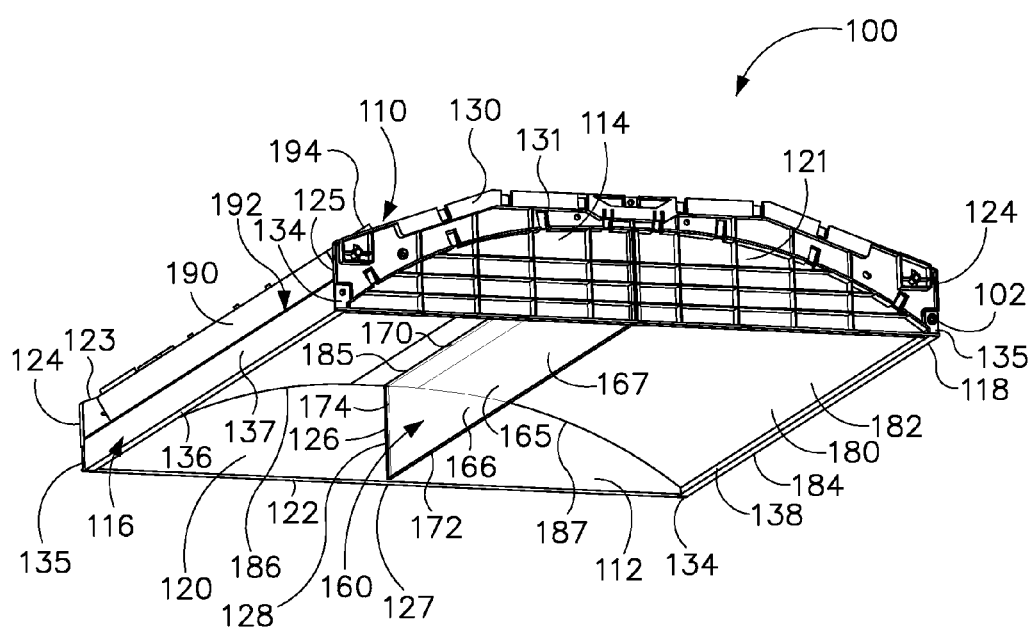
FIG. 1A is a perspective view of an edgelit LED blade fixture in accordance with an exemplary embodiment of the present invention.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to an apparatus and method providing assembly solutions for an edgelit light emitting diode ("LED") blade fixture. The invention is better understood by reading the following description of non-limiting, exemplary embodiments with reference to the attached drawings, wherein like parts of each of the figures are identified by like reference characters, and which are briefly described as follows.

Figure 1B:
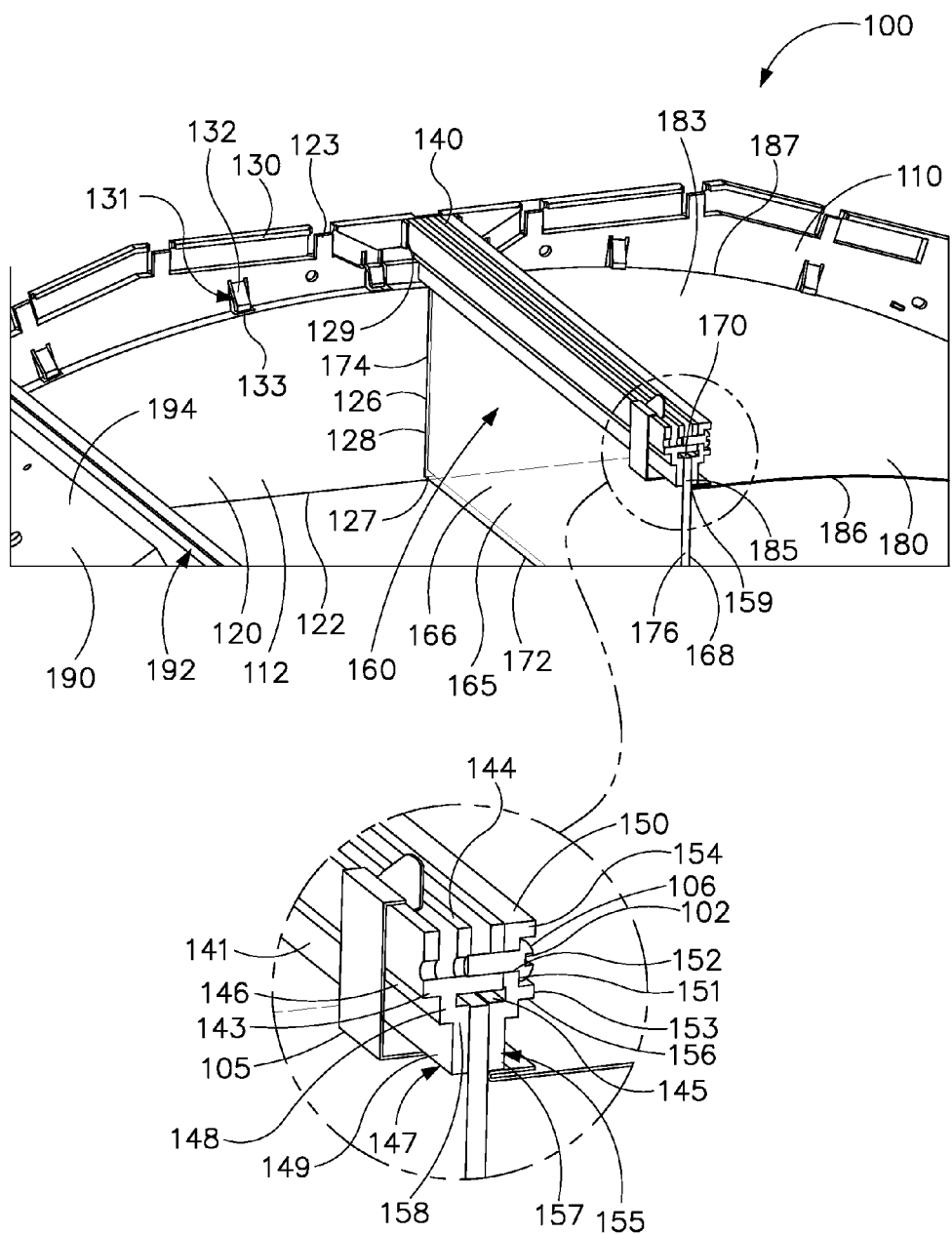
FIG. 1B is another perspective view of the edgelit LED blade fixture of FIG. 1A with one reflector removed in accordance with an exemplary embodiment of the present invention.
Figure 2:
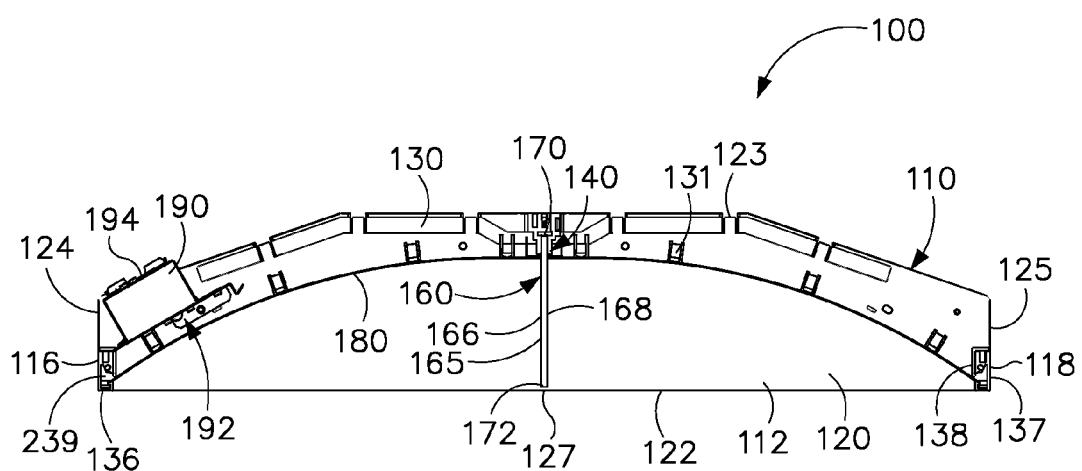
FIG. 2 is a cross-sectional view of the edgelit LED blade fixture of FIG. 1A in accordance with an exemplary embodiment of the present invention.

FIG. 1A is a perspective view of an edgelit LED blade fixture 100 in accordance with an exemplary embodiment of the present invention. FIG. 1B is another perspective view of the edgelit LED blade fixture 100 with one reflector removed in accordance with an exemplary embodiment of the present invention. FIG. 2 is a cross-sectional view of the edgelit LED blade fixture 100 in accordance with an exemplary embodiment of the present invention Referring to FIGS. 1A, 1B, and 2, the edgelit LED blade fixture 100 includes a frame 110, a heat sink assembly 140, an LED assembly 160, and one or more reflectors 180. In certain exemplary embodiments, the edgelit LED blade fixture 100 optionally also includes a gear tray 192, which includes a driver (not shown) and other electrical equipment, such as wires, housed at least partially therein.

The frame 110 includes a first end plate 112, a second end plate 114, a first side rail 116, and a second side rail 118. According to other exemplary embodiments, the frame 110 includes greater or fewer components, such as including a top cover (not shown) being coupled to each of the top edges of the first end plate 112, the second end plate 114, the first side rail 116, and the second side rail 118. Although the frame 110 includes two end plates 112, 114, the description of both end plates 112, 114 is collectively provided below for the sake of brevity. Similarly, although the frame 110 includes two side rails 116, 118, the description of both side rails 116, 118 is collectively provided below for the sake of brevity.

According to certain exemplary embodiments, each end plate 112, 114 includes an interior surface 120, an exterior surface 121, a bottom edge 122, a top edge 123, a first side edge 124 extending from one end of the bottom edge 122 to a corresponding end of the top edge 123, and a second side edge 125 extending from one end of the bottom edge 122 to a corresponding end of the top edge 123. The first and second side edges 124, 125 extend substantially orthogonally away from the bottom edge 122 towards the top edge 123. The top edge 123 has three segments according to some exemplary embodiments, wherein the first and third segments extend upwardly at an angle towards one another from a respective upper end of the first and second side edges 124, 125. The second segment is substantially parallel to the bottom edge 122 and extends between the first and third segments. Although one shape has been described for the top edge 123 in some exemplary embodiments, other shapes having greater or fewer segments and/or having one or more curved portions are used in alternative exemplary embodiments.

The end plates 112, 114 are fabricated from plastic, which is injection molded according to some exemplary embodiments. However, other suitable materials, such as aluminum, other metals, metal alloys, or other polymer types, are used to fabricate the end plates 112, 114 in other exemplary embodiments. Regardless of the material chosen to fabricate the end plates 112, 114, at least a portion of the interior surface 120 is made to be reflective according to some exemplary embodiments. For example, either the interior surface 120 is polished, painted with a reflective material, such as a white paint, or made to be reflective using any other methods known to people having ordinary skill in the art. Alternatively, according to some exemplary embodiments, this interior surface 120 of the end plates 112, 114 is non-reflective.

According to certain exemplary embodiments, each end plate 112, 114 also includes a slot 126 formed within the interior surface 120 and extending from the top edge 123 towards, but not through, the bottom edge 122. Hence, a stop mechanism 127, which is described in further detail below, is formed at the end of the slot 126 adjacent the bottom edge 122. A bottom portion 128 of the slot 126 includes a width substantially similar to, but slightly larger than, the width of a waveguide 165, thereby allowing the bottom portion 128 of the slot 126 to slidably receive an edge of the waveguide 165. Further, a top portion 129 of the slot 126 is formed having a greater width, according to some exemplary embodiments, that is substantially similar to, but slightly larger than, the width of the heat sink assembly 140 once coupled to the LED assembly 160, thereby allowing the top portion 129 of the slot 126 to slidably receive an edge of the heat sink assembly 140. According to some exemplary embodiments, the slot 126 is formed substantially perpendicularly with respect to the bottom edge 122 and substantially along the middle of each end plate 112, 114. However, in alternative exemplary embodiments, the slot 126 is formed substantially non-perpendicularly with respect to the bottom edge 122. For example, the slot 126 is formed at an angle with respect to the bottom edge 122, the angle ranging from between about forty-five degrees to less than ninety degrees. The slot 126 facilitates positioning of the waveguide 165 and the heat sink assembly 140 within the frame 110 and also provides support to the waveguide 165 and the heat sink assembly 140 once positioned within the frame 110.

According to certain exemplary embodiments, each end plate 112, 114 also includes one or more wireway tabs 130 formed along, or molded into, the top edge 123 and extend from the top edge 123 towards the bottom edge 122. The entire wireway tab 130 is positioned above the reflector 180 once coupled to the frame 110. According to certain exemplary embodiments, these wireway tabs 130 are formed during the manufacture of the end plates 112, 114; however, in other exemplary embodiments, these wireway tabs 130 are formed after the end plates 112, 114 are fabricated. The formation of the wireway tabs 130 is known to people having ordinary skill in the art and having the benefit of the present disclosure. The wireway tabs 130 are either bendable or removable to allow one or more electrical wires (not shown) to pass through when being electrically connected from a power source (not shown) or driver (not shown) housed within the gear tray 192 to the LED assembly 140. The wireway tabs 130 are substantially rectangularly shaped, but are shaped into different geometric or non-geometric shapes in other exemplary embodiments. According to some exemplary embodiments, each end plate 112, 114 includes six wireway tabs 130 formed therein, three wireway tabs 130 on each side of the slot 126. However, in alternative exemplary embodiments, greater or fewer wireway tabs 130 are formed within each end plate 112, 114. Also, the number of wireway tabs 130 on each side of the slot 126 can be different in certain exemplary embodiments. Further, the number of wireway tabs 130 formed in each of the end plates 112, 114 can be different from one another.

According to certain exemplary embodiments, each end plate 112, 114 also includes one or more snaps 131 formed, or molded, therein. The snaps 131 are substantially rectangularly shaped, but can be shaped into a different geometric or non-geometric shape if desired in other exemplary embodiments. Each snap 131 includes a first portion 132 and a second portion 133 extending from the first portion 132. The first portion 131 is bent inwardly towards the other end plate 112, 114 and the second portion 133 is bent still further towards the other end plate 112, 114 once the frame 110 is assembled. A lower end of the first portion 132 is positioned substantially at the same position as the reflector 180 while an upper end of the first portion 132 is positioned elevationally above the position of the reflector 180 once the reflector 180 is coupled to the frame 110. The second portion 133 is positioned substantially at the same position as the reflector 180 once the reflector 180 is coupled to the frame 110 and provides support for holding the reflector 180 in position. Hence, snaps 131 are provided for snapping in, installing, or coupling the reflector 180 to the frame 110. According to some exemplary embodiments, each end plate 112, 114 includes eight snaps 131 formed therein, four snaps 131 on each side of the slot 126. However, in alternative exemplary embodiments, greater or fewer snaps 131 are formed within each end plate 112, 114. Also, the number of snaps 131 on each side of the slot 126 can be different. Further, the number of snaps 131 formed in each of the end plates 112, 114 can be different from one another.

According to some exemplary embodiments, the snaps 131 are aligned in an intermittent curved-shape when viewed along any one end of the end plate 112, 114 to the slot 126 and receives a curved-shape reflector 180. Thus, one curved-shape reflector 180 is coupled to the snaps 131 positioned along one side of the slot 126 and another curved-shape reflector 180 is coupled to the snaps 131 positioned along the other side of the slot 126. However, in some other exemplary embodiments, the snaps 131 are aligned in an intermittent substantially linear shape when viewed along any one end of the end plate 112, 114 to the slot 126 and receives a flat shape reflector. Thus, one flat-shape reflector is coupled to the snaps 131 positioned along one side of the slot 126 and another flat-shape reflector is coupled to the snaps 131 positioned along the other side of the slot 126. Although two reflector designs and snap 131 orientations have been described, other reflector designs and snap 131 orientations are contemplated herein. For example, another such design includes each reflector having two curved portions that form an apex adjacent the slot 126 once installed, or coupled, to the frame 110.

According to certain exemplary embodiments, each side rail 116, 118 includes a front face 134, a rear face 135, a bottom edge 136, an external longitudinal edge 137, and an internal longitudinal edge 138. The side rails 116, 118 are fabricated from aluminum, which are extruded according to certain exemplary embodiments. However, according to some other exemplary embodiments, the side rails 116, 118 are fabricated using other suitable materials including, but not limited to, other metals, metal alloys, plastics, and other polymer types. The front face 134 and the rear face 135 of each side rail 116, 118 both include an aperture (not shown). The apertures of the first side rail's front face 134 and rear face 135 are aligned with the openings (not shown) formed within the second end plate's second side edge 125 and the first end plate's first side edge 124, respectively. Similarly, the apertures of the second side rail's front face 134 and rear face 135 are aligned with the openings (not shown) formed within the first end plate's second side edge 125 and the second end plate's first side edge 124, respectively. A fastener 102, such as a screw, rivet, or any other suitable fastener, is inserted through each of the aligned apertures and openings to couple the first side rail 116 between the first end plate's first side edge 124 and the second end plate's second side edge 125 and to couple the second side rail 118 between the first end plate's second side edge 125 and the second end plate's first side edge 125. Once coupled, the bottom edge 136 of the first and second side rails 116, 118 are positioned substantially within the same plane as the bottom edge 122 of the first and second end plates 112, 114. The external longitudinal edge 137 and the internal longitudinal edge 138 of each side rail 116, 118 extend between the first and second end plates 112, 114. The internal longitudinal edge 138 of each side rail 116, 118 includes a cavity 239 formed along its length and extending from the internal longitudinal edge 138 to within the side rail 116, 118. The cavity 239 is configured to receive an edge of the reflector 180 once the reflector 180 is positioned within the frame 110.

Figure 3A:
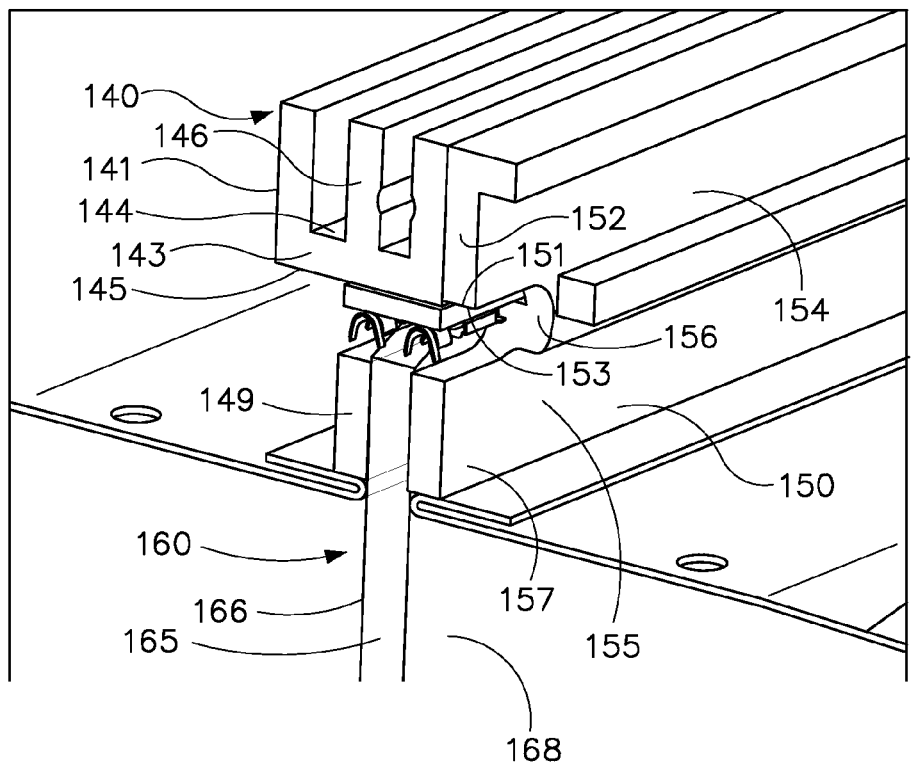
FIG. 3A is partial perspective view of a heat sink assembly and an LED assembly of FIG. 1B in accordance with an exemplary embodiment of the present invention.
Figure 3B:
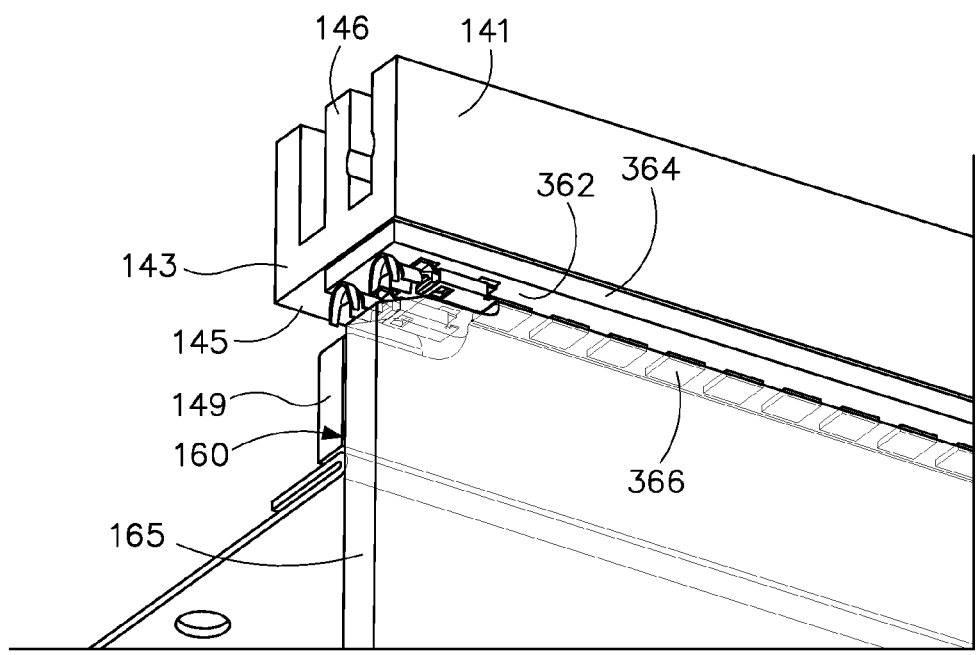
FIG. 3B is a partial perspective view of a portion of the heat sink assembly and the LED assembly of FIG. 3A with a heat sink cap removed in accordance with an exemplary embodiment of the present invention.

FIG. 3A is partial perspective view of the heat sink assembly 140 and the LED assembly 160 in accordance with an exemplary embodiment of the present invention. FIG. 3B is a partial perspective view of a portion of the heat sink assembly 140 and the LED assembly 160 with a heat sink cap 150 removed in accordance with an exemplary embodiment of the present invention. Referring to FIGS. 1A-3B, the heat sink assembly 140 is a two-component construction; however, in other exemplary embodiments, the heat sink assembly 140 is constructed in fewer or greater components. The heat sink assembly 140 includes a heat sink base 141 and a heat sink cap 150.

The heat sink base 141 includes a base 143, one or more fins 146 extending orthogonally away from the base 143, and a mounting arm 147 extending outwardly away from the base 143 in an opposite direction than the fins 146. The heat sink base 141 is fabricated as a single component using a thermally conductive material, such as aluminum. However, in other exemplary embodiments, the heat sink base 141 is formed from greater number of components. Further, in other exemplary embodiments, the heat sink base 141 is fabricated using other suitable thermally conductive materials.

The base 143 includes a first surface 144 and a second surface 145 facing an opposite direction than the first surface 144. According to certain exemplary embodiments, the first and second surfaces 144, 145 are substantially planar. The base 143 extends a length equivalent to the distance between the first end plate 112 and the second end plate 114 once the frame 110 is assembled. The fins 146 extend outwardly away from the first surface 144 in a parallel orientation from one another and substantially along the length of the base 143. However, according to certain other exemplary embodiments, one or more fins 146 are substantially non-parallel to at least one other fin 146. The fins 146 facilitate heat dissipation that is generated from the LEDs 366, which are described in further detail below. According to some exemplary embodiments, there are three fins 146 extending outwardly from the first surface 144; however, greater or fewer fins 146 extend outwardly from the first surface 144 in other exemplary embodiments. The mounting arm 147 extends substantially along the length of the base 143 and includes a first portion 148 and a second portion 149. The first portion 148 extends substantially orthogonally away from the second surface 145. A portion of the second portion 149 is positioned adjacent an end of the first portion 148 such that the portion of the second portion 148 vertically overlaps with the end of the first portion 148. The remaining portion of the second portion 149 extends further away from the base 143 than the end of the first portion 148. Alternatively, the mounting arm 147 extends linearly away from the second surface 145.

The heat sink cap 150 includes a base 151, one or more fins 154 extending orthogonally away from the base 151, and a mounting arm 155 extending outwardly away from the base 151 in an opposite direction than the fins 154. The heat sink cap 150 is fabricated as a single component using a thermally conductive material, such as aluminum. However, in other exemplary embodiments, the heat sink cap 150 is formed from greater number of components. Further, in other exemplary embodiments, the heat sink cap 150 is fabricated using other suitable thermally conductive materials.

The base 151 includes a first surface 152 and a second surface 153 facing an opposite direction than the first surface 152. According to certain exemplary embodiments, the first and second surfaces 152, 153 are substantially planar. The base 151 extends a length equivalent to the distance between the first end plate 112 and the second end plate 114 once the frame 110 is assembled. According to some exemplary embodiments, one fin 154 extends outwardly away from the first surface 152 and substantially along the length of the base 151. According to some exemplary embodiments, the width of the fin 154 is the same as the width of the first surface 152. However, according to certain other exemplary embodiments, a plurality of fins 154 extend outwardly form the first surface 152 in a substantially parallel manner to one another or where at least one fin 154 is substantially non-parallel to at least one other fin 154. The fin 154 facilitates heat dissipation that is generated from the LEDs 366, which are described in further detail below. The mounting arm 155 extends substantially along the length of the base 151 and includes a first portion 156 and a second portion 157. The first portion 156 extends substantially orthogonally away from the second surface 153. A portion of the second portion 157 is positioned adjacent an end of the first portion 156 such that the portion of the second portion 157 vertically overlaps with the end of the first portion 156. The remaining portion of the second portion 157 extends further away from the base 151 than the end of the first portion 156. Alternatively, the mounting arm 155 extends linearly away from the second surface 153.

When forming the heat sink assembly 140, the heat sink base 141 is positioned adjacent the heat sink cap 150 such that the base 143 of the heat sink base 141 is horizontally aligned with the base 151 of the heat sink cap 150. Once the heat sink base 141 is properly positioned adjacent the heat sink cap 150, an opening 105 formed though one or more of the fins 146 of the heat sink base 141 is aligned with an opening 106 formed through the fin 154 of the heat sink cap 150 through which a fastener 102, such as a screw, rivet, or any other suitable fastener, is inserted therethrough. Hence, the heat sink base 141 is thereby coupled to the heat sink cap 150, thereby forming the heat sink assembly 140. Once the heat sink assembly 140 is formed, an LED housing cavity 158 and a waveguide housing cavity 159 are formed, both extending substantially the length of the heat sink base 141. The LED housing cavity 158 is formed between the base 143 of the heat sink base 141, the base 151 of the heat sink cap 150, a portion of the heat sink base's mounting arm's first portion 148, and a portion of the heat sink cap's mounting arm's first portion 156. The waveguide housing cavity 159 extends from the LED housing cavity 158 and is bounded between the second portions 149, 157. The waveguide housing cavity 159 extends a distance to an end of the second portions 149, 157. According to certain exemplary embodiments, the LED housing cavity 158 has a greater width than the waveguide housing cavity 159. However, in other exemplary embodiments, the width of the LED housing cavity 158 is not greater than the width of the waveguide housing cavity 159. The LED housing cavity 158 is configured to receive one or more LED modules 362, while the waveguide housing cavity 159 is configured to receive a portion of the waveguide 165.

The LED assembly 160 includes at least one LED module 362 and a waveguide 165 optically coupled to the LED modules 362. The LED module 362 includes a substrate 364 and one or more LEDs 366 mounted thereon. The substrate 364 is dimensioned to have a width substantially equal to or less than the width of the LED housing cavity 158 since the substrate is to be coupled to, or mounted on, either the base 143 of the heat sink base 141 and/or the base 151 of the heat sink cap 150. According to certain exemplary embodiments, the substrate 364 is coupled to the base 143 of the heat sink base 141 and/or the base 151 of the heat sink cap 150 using a thermal tape (not shown). The LEDs 366 are oriented to emit light towards the waveguide housing cavity 159.

According to certain exemplary embodiments, the substrate 364 includes one or more sheets of ceramic, metal, laminate, circuit board, mylar, or another material. Each LED 366 includes a chip of semi-conductive material that is treated to create a positive-negative ("p-n") junction. When the LEDs 366 or LED packages are electrically coupled to a power source, such as the driver, current flows from the positive side to the negative side of each junction, causing charge carriers to release energy in the form of incoherent light.

The wavelength or color of the emitted light depends on the materials used to make the LEDs 366 or LED packages. For example, a blue or ultraviolet LED typically includes gallium nitride ("GaN") or indium gallium nitride ("InGaN"), a red LED typically includes aluminum gallium arsenide ("AlGaAs"), and a green LED typically includes aluminum gallium phosphide ("AlGaP"). Each of the LEDs 366 in the LED package can produce the same or a distinct color of light. For example, in certain exemplary embodiments, the LED package include one or more white LEDs and one or more non-white LEDs, such as red, yellow, amber, or blue LEDs, for adjusting the color temperature output of the light emitted from the fixture. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain exemplary embodiments, the emitted light includes substantially white light that seems slightly blue, green, red, yellow, orange, or some other color or tint. In certain exemplary embodiments, the light emitted from the LEDs 366 has a color temperature between 2500 and 5000 degrees Kelvin.

In certain exemplary embodiments, an optically transmissive or clear material (not shown) encapsulates at least a portion of each LED 366 or LED package. This encapsulating material provides environmental protection while transmitting light from the LEDs 366. In certain exemplary embodiments, the encapsulating material includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating white light. In certain exemplary embodiments, the white light has a color temperature between 2500 and 5000 degrees Kelvin.

In certain exemplary embodiments, the LED 366 is an LED package that includes one or more arrays of LEDs 366 that are collectively configured to produce a lumen output from 1 lumen to 5000 lumens. The LEDs 366 or the LED packages are attached to the substrate 364 by one or more solder joints, plugs, epoxy or bonding lines, and/or other means for mounting an electrical/optical device on a surface. The substrate 364 is electrically connected to support circuitry (not shown) and/or the LED driver for supplying electrical power and control to the LEDs 366 or LED packages. For example, one or more wires (not shown) couple the substrate 364 to the driver, thereby completing a circuit between the driver, the substrate 364, and the LEDs 366. In certain exemplary embodiments, the driver is configured to separately control one or more portions of the LEDs 3660 in the array to adjust light color or intensity.

According to certain exemplary embodiments, the LED assembly 160 includes a single LED module 362 extending lengthwise along the base 143 of the heat sink base 141 and/or the base 151 of the heat sink cap 150. Alternatively, the LED assembly 160 includes a plurality of LED modules 362 extending lengthwise along the base 143 of the heat sink base 141 and/or the base 151 of the heat sink cap 150 with each LED module 362 being electrically coupled to an adjacently positioned LED module 362.

The waveguide 165 is substantially rectangularly shaped and includes a first surface 166, a second surface 168 facing a direction opposite the first surface 166, a first longitudinal edge 170, a second longitudinal edge 172 positioned opposite the first longitudinal edge 170, a first latitudinal edge 174 disposed between the first surface 166 and the second surface 168 and between the first longitudinal edge 170 and the second longitudinal edge 172, and a second latitudinal edge 176 positioned opposite the first latitudinal edge 174 and disposed between the first surface 166 and the second surface 168 and between the first longitudinal edge 170 and the second longitudinal edge 172. Alternatively, the waveguide 165 is formed in a different shape that is either geometric or non-geometric in other exemplary embodiments. The waveguide 165 is fabricated from an acrylic material and is substantially clear or translucent. Alternatively, the waveguide 165 is formed using other suitable materials, such as glass, and can be, or made to be, opaque, if desired. At least one of the first surface 166 and/or the second surface 168 include features 167 formed into the surfaces 166, 168. According to certain exemplary embodiments, both surfaces 166, 168 include these features 167. The features 167 are etchings formed into the surfaces 166, 168. The features 167 are indentations formed using dimples, lasers, or are molded therein. These features 167 facilitate in bringing the light present within the waveguide 165 outside of the waveguide 165.

In coupling the heat sink assembly 140 and the LED assembly 160 to the frame 110, the waveguide 165 is inserted into the slots 126 formed within each of the first and second end plates 112, 114. Specifically, a bottom end of the first latitudinal edge 174 is aligned with a top portion of the slot 126 formed within the first end plate 112 and a bottom end of the second latitudinal edge 176 is aligned with a top portion of the slot 126 formed within the second end plate 114. The first latitudinal edge 174 and the second latitudinal edge 176 of the waveguide 165 is then slidingly moved along the slots 126 until the first latitudinal edge 174 and/or the second longitudinal edge 172 engages the stop mechanism 127 formed in the first end plate 112 and the second latitudinal edge 176 and/or the second longitudinal edge 172 engages the stop mechanism 127 formed in the second end plate 114. The LED module 362 is coupled to the base 143 of the heat sink base 141 along its length. The heat sink cap 150 is aligned with the heat sink base 141 according to the description provided above. The heat sink base 141, the heat sink cap 141, and the LED module 362 disposed therebetween are collectively inserted into the slot 126 such that the first longitudinal edge 170 is positioned adjacent the LEDs 366 and an upper portion of the waveguide 165 is disposed within the waveguide housing cavity 159. Once positioned, the fastener 102 couples the heat sink cap 150 to the heat sink base 141, which thereby places each of heat sink cap 150 and heat sink base 141 in contact with the upper portion of the waveguide 165. Thus, during operation of the fixture 100, the light emitted from the LEDs 366 enters the waveguide 165 through the first longitudinal edge 170 and is directed towards the second longitudinal edge 172. However, the features 167, as mentioned above, facilitates removal of the light from within the waveguide 165 through these features 167.

The reflector 180 includes a reflector interior surface 182, a reflector exterior surface 183, a first longitudinal edge 184, a second longitudinal edge 185 positioned opposite the first longitudinal edge 184, a first side edge 186 extending from the first longitudinal edge 184 to the second longitudinal edge 185, and a second side edge 187 positioned opposite the first side edge 186 and extending from the first longitudinal edge 184 to the second longitudinal edge 185. According to certain exemplary embodiments, the reflector interior surface 182 is fabricated using a reflective material or is fabricated using a non-reflective material and subsequently made to be reflective. For example, the reflector interior surface 182 is polished according to some exemplary embodiments or is painted to be made reflective. Hence, some light emitted from the surfaces 166, 168 of the waveguide 165 is directed towards the reflector interior surface 182 and reflected downwardly to a desired area to be lit, for example, a room or a hallway. Two reflectors 180 are coupled to the frame 110, one reflector 180 on each side of the slot 126. The reflector interior surface 182 is curved shaped according to some exemplary embodiments, while in others, the reflector interior surface 182 is substantially planar, or flat-paneled. The shape of the reflector 180 and the features 167 in the waveguide 165 produce the desire light output.

Each reflector 180 is coupled within the frame 110 by positioning the reflector 180 above the frame 110 and lowering the reflector into the frame 110. The reflector 180 is oriented with the reflector interior surface 182 facing downward. One reflector 180 is positioned within the frame 110 on one side of the slot 126, while another reflector 180 is positioned within the frame 110 on another side of the slot 126. As the reflector 180 is lowered into the frame 110, the first longitudinal edge 184 is positioned within the cavity 239 of the respective first or second side rails 116, 118, the first and second side edges 186, 187 are secured, via snapping, to the respective first or second end plates 112, 114 via the snaps 132, and the second longitudinal edge 185 is positioned adjacent the respective first or second surfaces 166, 168 adjacent the respective heat sink base 141 or heat sink cap 150.

The gear tray 192 is substantially rectangularly shaped and includes a gear housing 190 forming a cavity (not shown) therein and an optional removable cover 194 coupled to the housing 190. Although the gear tray 192 is rectangularly shaped, the gear tray 192 is shaped differently in other exemplary embodiments. The LED driver is inserted into the housing 190 and is used to supply power and control the LEDs 366. The LED driver is supplied power from a power source (not shown) via electrical wires (not shown), which then supplies power to the LEDs 366 via different electrical wires (not shown). The electrical wires supplying power from the driver to the LEDs 366 can be routed through one or more wireway tabs 130, which are removed or manipulated to make space for routing the electrical wires therethrough. The gear tray 192 is coupled to a top portion of the frame 110 above the reflector 180 and near one of the side rails 116, 118. Optionally, a second gear tray (not shown) is mounted in a similar location, but adjacent the other side rail 116, 118. The second gear tray optionally houses a second driver to control one or more LEDs 366 and/or a back-up battery (not shown) that provides power to the LEDs 366 during a power failure.

Figure 4:
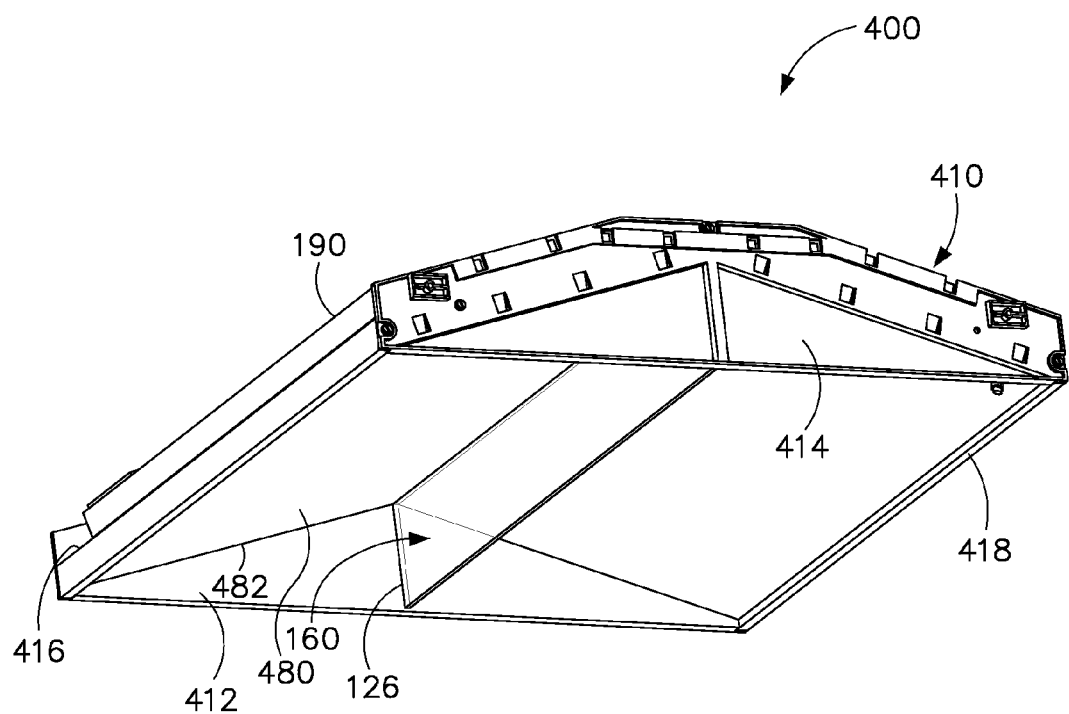
FIG. 4 is a perspective view of an edgelit LED blade fixture in accordance with another exemplary embodiment of the present invention.
Figure 5:
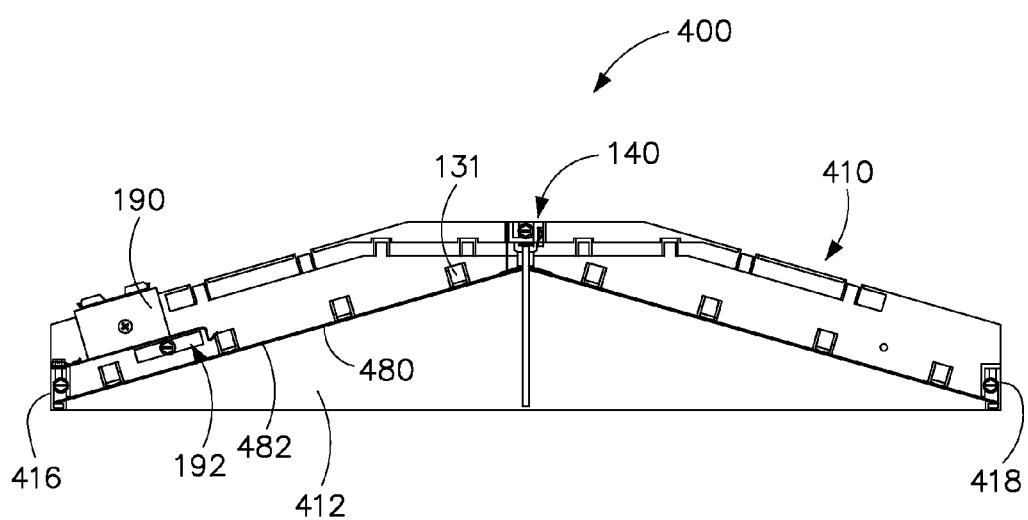
FIG. 5 is a cross-sectional view of the edgelit LED blade fixture of FIG. 4 in accordance with the exemplary embodiment of the present invention.

FIG. 4 is a perspective view of an edgelit LED blade fixture 400 in accordance with another exemplary embodiment of the present invention. FIG. 5 is a cross-sectional view of the edgelit LED blade fixture 400 in accordance with the exemplary embodiment of the present invention. Referring to FIGS. 4 and 5, the edgelit LED blade fixture 400 includes the frame 410, the heat sink assembly 140, the LED assembly 160, and one or more reflectors 480. In certain exemplary embodiments, the edgelit LED blade fixture 400 optionally also includes a gear tray 192, which includes a driver (not shown) and other electrical equipment, such as wires, housed at least partially therein. In certain additional exemplary embodiments, the edgelit LED blade fixture 400 also optionally includes a second gear tray (not shown), which includes a back-up battery (not shown) and/or other electrical equipment, such as wires, housed at least partially therein. The edgelit LED blade fixture 400 is similar to the edgelit LED blade fixture 100 (FIGS. 1A-3B) except for the positioning of the snaps 131 within the end plates 412, 414, which are similar to end plates 112, 114 (FIGS. 1A-3B), and the shape of the reflector 480. According to these exemplary embodiments, the snaps 131 are positioned in an intermittent linear manner extending from the side rail 416, 418, which are similar to the side rails 116, 118 (FIGS. 1A-3B), toward the bottom end of the heat sink assembly 140. These snaps 131 accommodate receiving and coupling the reflector 480 to the frame 410. Each reflector 480 includes a flat-paneled surface 482. Hence, one reflector 480 is positioned along one side of the slot 126, while another reflector 480 is positioned along another side of the slot 126.

Figure 6:
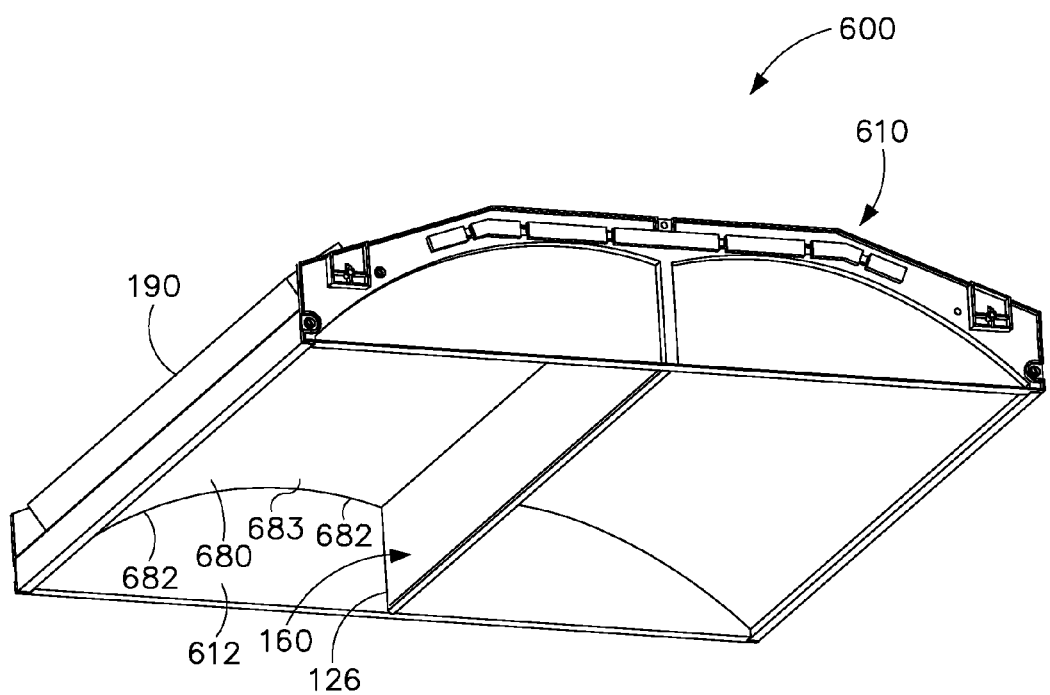
FIG. 6 is a perspective view of an edgelit LED blade fixture in accordance with yet another exemplary embodiment of the present invention.
Figure 7:
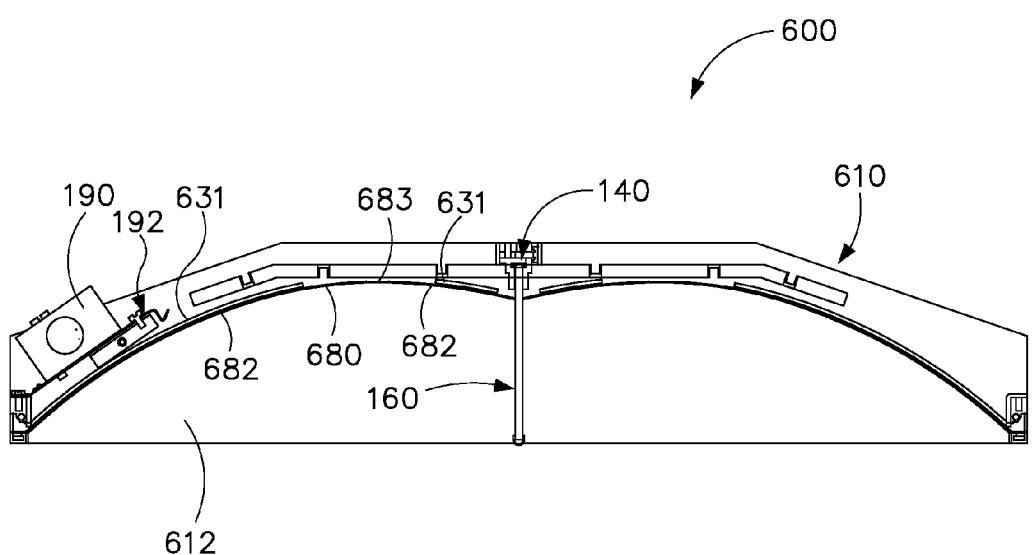
FIG. 7 is a cross-sectional view of the edgelit LED blade fixture of FIG. 6 in accordance with the exemplary embodiment of the present invention.

FIG. 6 is a perspective view of an edgelit LED blade fixture 600 in accordance with yet another exemplary embodiment of the present invention. FIG. 7 is a cross-sectional view of the edgelit LED blade fixture 600 in accordance with the exemplary embodiment of the present invention. Referring to FIGS. 6 and 7, the edgelit LED blade fixture 600 includes the frame 610, the heat sink assembly 140, the LED assembly 160, and one or more reflectors 680. In certain exemplary embodiments, the edgelit LED blade fixture 600 optionally also includes a gear tray 192, which includes a driver (not shown) and other electrical equipment, such as wires, housed at least partially therein. In certain additional exemplary embodiments, the edgelit LED blade fixture 600 also optionally includes a second gear tray (not shown), which includes a back-up battery (not shown) and/or other electrical equipment, such as wires, housed at least partially therein. The edgelit LED blade fixture 600 is similar to the edgelit LED blade fixture 100 (FIGS. 1A-3B) except for the inclusion of the snaps 131 (FIG. 1B) within the end plates 612, 614, which are similar to end plates 112, 114 (FIGS. 1A-3B), and the shape of the reflector 680. In lieu of the snaps 131, one or more protrusions 631 extend outwardly from each of the side rails 616, 618, which are similar to the side rails 116, 118 (FIGS. 1A-3B), and from each of the end plates 612, 614 to accommodate the shape of the reflector 680. These protrusions 631 are curve-shaped. These protrusions 631 accommodate receiving and coupling the reflector 680 to the frame 610. Each reflector 680 includes two curved surfaces 682 that forms an apex 683 nearer the heat sink assembly 140. Hence, one reflector 680 is positioned along one side of the slot 126, while another reflector 680 is positioned along another side of the slot 126.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A lighting system comprising:
a frame comprising:
a first end plate; and
a second end plate positioned opposite to and at a distance from the first end plate;
a lightguide extending between the first end plate and the second end plate and comprising a first longitudinal edge, a second longitudinal edge positioned opposite the first longitudinal edge, a first lateral edge, and a second lateral edge positioned opposite the first lateral edge,
wherein the first longitudinal edge, the second longitudinal edge, the first lateral edge, and the second lateral edge are integrally formed with the lightguide,
wherein a width of the first lateral edge and the second lateral edge is substantially the same from the first longitudinal edge to the second longitudinal edge, and
wherein the lightguide is oriented such that the first longitudinal edge faces a direction substantially opposite an area to be illuminated and the second longitudinal edge faces the area to be illuminated;
one or more LEDs optically coupled to the lightguide, wherein light emitted by the one or more LEDs enters the lightguide through the first longitudinal edge and is directed towards the second longitudinal edge; and
a first reflector and a second reflector, the first reflector being coupled to the first and second end plates using a first plurality of snaps positioned on a first portion of each of the first and second end plates, the second reflector being coupled to the first and second end plates using a second plurality of snaps positioned on a second portion of each of the first and second end plates.

2. The lighting system of claim 1, wherein each of the first and second end plates provide a stop mechanism that prevents downward movement of the lightguide beyond a predetermined position.

3. The lighting system of claim 1, wherein a surface of the first reflector and a surface of the second reflector have a flat shape.

4. The lighting system of claim 1, wherein a surface of the first reflector and a surface of the second reflector have a curved shape.

5. The lighting system of claim 1, wherein the lightguide comprises a first surface and a second surface opposite to the first surface and bounded by the first longitudinal edge, the second longitudinal edge, the first lateral edge, and the second lateral edge, and wherein at least one of the first and second surface of the lightguide comprises one or more features formed therein to direct the light present in the lightguide out of the lightguide.

6. A lighting system comprising:
a frame comprising:
a first end plate; and
a second end plate positioned opposite to and at a distance from the first end plate,
wherein each end plate includes a slot that is integrally formed into an interior surface of the respective end plate such that the slot extends into the respective end plate, wherein each slot extends from a top portion towards a bottom portion of the respective end plate, wherein each slot comprises:
an upper portion disposed near the top portion of the respective end plate and configured to house a portion of a heat sink assembly; and
a lower portion disposed near the bottom portion of the respective end plate and configured to house a portion of a lightguide; and
wherein the upper portion of each slot is wider than the lower portion of the respective slot;
the heat sink assembly extending from the first end plate to the second end plate, wherein a first end of the heat sink assembly is inserted into the upper portion of the slot of the first end plate and a second end of the heat sink assembly that is opposite to the first end is inserted into the upper portion of the slot of the second end plate, wherein the heat sink assembly engages the lightguide;
a light assembly comprising:

the lightguide comprising a first surface, a second surface facing a direction opposite the first surface, the first surface and the second surface bounded by a first longitudinal edge, a second longitudinal edge positioned opposite the first longitudinal edge, a first lateral edge, and a second lateral edge positioned opposite the first lateral edge,
   wherein the first lateral edge is inserted into the lower portion of the slot of the first end plate and the second lateral edge is inserted into the lower portion of the slot of the second end plate,
   wherein the lower portion of the slot in the first end plate covers the first lateral edge of the lightguide and the lower portion of the slot in the second end plate covers the second lateral edge of the lightguide, and
   wherein the lightguide is oriented such that the first longitudinal edge faces the heat sink assembly and the second longitudinal edge faces an area to be illuminated; and
one or more light emitting diodes (LEDs) disposed on the heat sink assembly and optically coupled to the lightguide such that light emitted by the one or more LEDs enters the lightguide through the first longitudinal edge and is directed towards the second longitudinal edge.

7. The lighting system of claim 6, wherein the bottom portion of each of the the first and second end plates provides a stop mechanism preventing further downward movement of the lightguide once the lightguide is inserted into the slots of the first and second end plates.

8. The lighting system of claim 6, further comprising a reflector coupled to the frame and extending from the first end plate towards the second end plate.

9. The lighting system of claim 8, wherein a surface of the reflector has a flat shape.

10. The lighting system of claim 8, wherein a surface of the reflector has a curved shape.

11. The lighting system of claim 6, wherein at least one of the first and second surfaces of the lightguide comprises one or more features formed therein to direct the light present in the lightguide out of the lightguide.

12. The lighting system of claim 6, wherein the heat sink assembly comprises:
   a heat sink base comprising a base, one or more fins extending substantially orthogonally away from the base, and a mounting arm extending away from the base in a direction opposite of the one or more fins; and
   a heat sink cap coupled to the heat sink base, the heat sink cap comprising a base horizontally aligned with the base of the heat sink base, one or more fins extending substantially orthogonally away from the base of the heat sink cap, and a mounting arm extending away from the base of the heat sink cap in a direction opposite of the one or more fins of the heat sink cap and facing the mounting arm of the heat sink base,
   wherein the mounting arm of the heat sink cap and the mounting arm of the heat sink base define a first chamber adjacent the bases of the heat sink cap and the heat sink base and a second chamber adjacent the first chamber and further away from the bases of the heat sink cap and the heat sink base,
   wherein the LEDs are coupled to a substrate, the substrate and LEDs being substantially positioned within the first chamber, and
   wherein the portion of the lightguide is positioned within the second chamber, the first longitudinal edge of the lightguide being positioned adjacent the LEDs.

13. A lighting system comprising:
a heat sink assembly comprising:
   a heat sink base that comprises a first base and a first set of fins extending substantially perpendicular to the first base; and
   a heat sink cap that comprises a second base and a second fin extending substantially perpendicular to the second base,
      wherein the heat sink base and the heat sink cap extend between a first end plate of a frame of the lighting system and a second end plate of the frame of the lighting system,
      wherein the first set of fins comprise a first opening that extends through the first set of fins and wherein the second fin comprises a second opening that extends through the second fin,
      wherein the heat sink base is aligned with the heat sink cap such that the first opening that extends through the first set of fins of the heat sink base is aligned with the second opening formed through the second fin of the heat sink cap, and
      wherein a fastener is positioned in the first opening and the second opening; and
a light emitting diode (LED) assembly comprising:
   a lightguide comprising a first surface, a second surface, and a first longitudinal edge disposed between the first and second surfaces; and
   one or more LEDs disposed on a substrate, the one or more LEDs facing and emitting light into the first longitudinal edge of the lightguide,
      wherein the substrate is coupled to and positioned below one or more fins of the first set of fins of the heat sink base and the second fin of the heat sink cap, and
      wherein a portion of the heat sink base and the heat sink cap engages a portion of the light guide to hold the first longitudinal edge of the lightguide adjacent to the one or more LEDs.

14. The lighting system of claim 13, wherein the fastener is operable to bring the heat sink cap and the heat sink base together.

15. The lighting system of claim 13, wherein:
the first end plate comprises a top edge, a bottom edge, an internal surface extending from the top edge to the bottom edge, and a slot formed into the internal surface and extending from the top edge towards the bottom edge; and
the second end plate comprises a top edge, a bottom edge, an internal surface extending from the top edge to the bottom edge, and a slot formed into the internal surface and extending from the top edge towards the bottom edge,
wherein a first lateral edge of the lightguide is inserted into the slot of the first end plate and a second lateral edge of the lightguide is inserted into the slot of the second end plate.

16. The lighting system of claim 15, wherein each of the first and second end plates further comprises a plurality of snaps, the plurality of snaps being positioned on each side of the slot formed in each of the first and second end plates.

17. The lighting system of claim 16, further comprising one or more wireway tabs disposed on at least one of the first end plate and the second end plate to route electrical wires that are electrically coupled to the LEDs.

18. The lighting system of claim 13, wherein at least one of the first or second surfaces of the lightguide comprises one or more features formed therein to direct the light present in the lightguide out of the lightguide.

* * * * *